United States Patent
Sakamoto et al.

[11] Patent Number: 6,131,685
[45] Date of Patent: *Oct. 17, 2000

[54] POWER TRAIN SUPPORTING APPARATUS

[75] Inventors: Sunao Sakamoto; Soichiro Okudaira, both of Toyota; Yoshio Shirai, Okazaki, all of Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/772,960

[22] Filed: Dec. 24, 1996

[30] Foreign Application Priority Data

Dec. 27, 1995 [JP] Japan .................................... 7-340730
Apr. 22, 1996 [JP] Japan .................................... 8-100005

[51] Int. Cl.⁷ .................................................. B62D 21/15
[52] U.S. Cl. .......................... 180/232; 280/784; 296/189
[58] Field of Search .................................... 280/784, 785, 280/777; 180/274, 232; 296/189

[56] References Cited

U.S. PATENT DOCUMENTS

| | | | |
|---|---|---|---|
| 3,578,782 | 5/1971 | Miyoshi | 180/232 |
| 3,851,722 | 12/1974 | Grosseau | 180/232 |
| 4,449,603 | 5/1984 | Langwieder et al. | 180/232 |
| 4,795,189 | 1/1989 | Vollmer et al. | 180/274 |
| 4,946,195 | 8/1990 | Ioka et al. | 280/777 |
| 5,042,837 | 8/1991 | Kleinschmit et al. | 280/784 |
| 5,054,810 | 10/1991 | Backhaus et al. | 280/777 |
| 5,472,063 | 12/1995 | Watanabe et al. | 280/784 |
| 5,492,193 | 2/1996 | Guertler et al. | 180/232 |
| 5,740,876 | 4/1998 | Shimose et al. | 180/232 |

FOREIGN PATENT DOCUMENTS

| | | |
|---|---|---|
| 2120386 | 8/1972 | France . |
| 40 25 031 | 2/1991 | Germany . |
| 42 13 789 | 10/1993 | Germany . |
| 4326396 | 2/1995 | Germany . |
| 63-49568 | 3/1988 | Japan . |
| 4-321475 | 11/1992 | Japan . |
| 5-185951 | 7/1993 | Japan . |
| 7-47844 | 2/1995 | Japan . |

OTHER PUBLICATIONS

Literature: ATZ, Automobilitechnische Zeitschrift 93 (1991), pp. 1–2.

*Primary Examiner*—Paul N. Dickson
*Attorney, Agent, or Firm*—Kenyon & Kenyon

[57] ABSTRACT

A power train supporting apparatus in an engine compartment of a vehicle has a ladder-like sub-frame located under the power train. Right and left sub-side members constituting the sub-frame each contain a curved portion, which facilitates bending thereof. A first engine mount and a second engine mount for bearing the weight of the power train are attached to these curved portions. A third engine mount for supporting the power train at the top is connected to a side frame member. The third engine mount releases the power train when a load exceeding a predetermined value is applied vertically to the power train. During a collision of the vehicle with an obstacle, the power train is released by the top engine mount when subjected to the impact and shifts downward to a space under the engine compartment. With an empty engine compartment, bending of the sub-side members is permitted, and thus the power train is prevented from interfering with these members.

28 Claims, 6 Drawing Sheets

POWER TRAIN SUPPORTING APPARATUS

BACKGROUND OF THE INVENTION

1. Field of the Invention

The present invention relates generally to a power train supporting apparatus in the engine compartment of a vehicle more particularly, the presesent invent ion relates to a power train supporting apparatus that can moderate the impact load applied to the passenger compartment when the vehicle bumps against an obstacle.

2. Description of the Related Art

Recently, the merits of small size vehicles have been evaluated from the standpoint of energy consumption and environmental costs. In reducing the size of a vehicle, it is necessary to ensure passenger comfort. Accordingly, small size vehicles are designed such that the limited body dimensions thereof are efficiently used. Meanwhile, it is important to moderate the impact load applied to the passenger compartment when the vehicle is bumped against an obstacle. Medium size vehicles and large size vehicles have relatively great body dimensions, so it is comparatively easy to take measures for moderating impact loads from collisions. On the other hand, the size of the small vehicles makes it difficult to take such measures. Therefore, there is a need to moderate collision impact loads in small size vehicles.

However, passenger comfort and demand for moderation of impact loads tend to run counter to each other, and it is not easy to satisfy both of these requirements. Generally, in a passenger car, a monocoque frame structure in which frames and body panels are integrated into one unit is employed. In this structure, the engine compartment in which a power train is to be housed is surrounded by side members, a front cross member, a toe board, etc. The power train is supported on the side members via mounts.

Provided that a vehicle having an engine located at its front bumped head on against an obstacle, the side members, which are located frontward of the passenger compartment, are subjected to an impact load in their axial directions such that they are likely to undergo compressive deformation. The power train supported on these members may be shifted by this deformation toward the passenger compartment. The impact load is reduced when the energy of the collision is converted into the energy required to deform the side members. A partition located between the engine compartment and the passenger compartment is liable to be damaged by the shifting of the power train during the collision. The degree of such damage to the partition depends on how much energy the side members can absorb before the power train is shifted. In other words, it depends on how much allowance for contraction the side members each have.

Since medium and large size vehicles generally have relatively long lengths, sufficient allowance for contraction is available in the side members. Accordingly, it is possible in medium and large size vehicles to provide necessary dimensions for the passenger compartment as well as to moderate impact loads. Damage to the partition of the passenger compartment caused by shifting of the power train can be controlled by the allowance for contraction in the side members. On the other hand, in small vehicles, it is not easy to simultaneously provide sufficient dimensions for the passenger compartment and a sufficient allowance for contraction for the front side members so as to control damage to the partition caused by shifting of the power train at collision.

German Laid-Open Patent Publication No. DE4326396A1 discloses an arrangement for an automotive prime mover (power train) in a vehicle having an extremely short bonnet, which can prevent the partition of the passenger compartment from being damaged by shifting of the prime mover (power train) at collision. As shown in FIG. 9, in a vehicle, a front mount 102 and a rear mount 103 support a prime mover 101 such that it is tilted forward below a toe board 100. The toe board 100 has a slant face 104 having substantially the same slant angle as that of the prime mover 101.

When the vehicle bumps against an obstacle, the front mount 102 releases the connection with the prime mover 101. The thus released prime mover 101 is guided along the slant face 104 of the toe board 100 toward the space under a floor panel 105. Thus, damage of the partition (including the toe board 100) caused by shifting of the prime mover 101 can be prevented.

FIGS. 10 and 11 each show a structure for moderating the collision impact upon a steering wheel in the passenger compartment. In a first impact moderating structure shown in FIG. 10, two steering shafts 110, 111 are connected to each other by a joint 112. According to this structure, the joint 112 separates at collision when the wheel 113 drops to release the connection between the shafts 110 and 111. Thus, the impact load acting upon the wheel 113 is moderated.

In a second impact moderating structure shown in FIG. 11, a steering wheel 120 is connected to a steering gear box 124 via a corrugated tube 121, a ball joint 122, a steering shaft 123 and another ball joint 122. According to this structure, the tube 121 is bent at collision to pivot the shaft 123 upward. Thus, the distance between the gear box 124 and the wheel 120 is shortened to moderate the impact load applied to the wheel 120.

However, in the prime mover (power train) arrangement structure described above, the prime mover 101 must be located below the toe board 100, and thus there is little design freedom in arranging the prime mover 101. Accordingly, in employing this arrangement in a vehicle, a special design must be contrived so that the prime mover 101 is located below the toe board 100. Further, in order to locate the prime mover 101 at a lower position, special designs must be contrived for the engine compartment and the suspension. Accordingly, a conventional power train and framework cannot be used. In other words, such an arrangement cannot be applied as such to existing vehicles. Therefore, there is a need for a structure that can moderate the impact load acting upon the passenger compartment based on minimal changes and improvements in the structure of existing small vehicles.

Meanwhile, in the arrangement shown in FIG. 9, this structure may fail to work properly in case of an offset collision, where one side at the front face of the vehicle bumps against an obstacle. That is, there is a fear that the prime mover 101 will not be guided smoothly to the space under the floor panel 105.

In the first impact moderating structure shown in FIG. 10, it is difficult to set the load for separating the joint 112 at an appropriate value relative to the impact load. More specifically, when the vehicle bumps lightly against an obstacle, rides over a hump or a gap, or when the vehicle runs on irregular ground, the joint 112 is not permitted to separate. The joint 112 is expected to separate only when the vehicle bumps heavily against an obstacle.

In the second impact moderating structure shown in FIG. 11, the rigidity of steering is lowered if the length of the corrugated tube 121 is increased very much. Accordingly, in order to maintain steering rigidity, a sufficient distance for contraction cannot be provided between the gear box 124 and the wheel 120. These two contradictory factors limit the design.

SUMMARY OF THE INVENTION

Accordingly, it is a primary objective of the present invention to moderate the impact load to act upon a passenger compartment, when a vehicle bumps against an obstacle, by allowing the power train to shift downward. In order to attain the intended objective, the present invention provides a power train supporting apparatus that permits downward shifting of the power train during a collision of the vehicle and also during an offset collision of the vehicle.

It is another objective of the present invention to provide a power train supporting apparatus that can permit a sufficient space in the engine compartment for absorbing the impact caused when a vehicle bumps against an obstacle and can moderate the impact acting upon the passenger compartment.

It is a further objective of the present invention to provide a power train supporting apparatus that can moderate, using a simple construction, the impact load acting upon steering devices located in the passenger compartment caused when a vehicle bumps against an obstacle.

To achieve the foregoing and other objects and in accordance with the purpose of the present invention, a power train supporting apparatus in an engine compartment of a vehicle is provided. The apparatus comprises a pair of side frames, wherein one side frame is located on each side of the vehicle, and wherein each side frame extends along a direction in which the vehicle advances and has a front end portion and a rear end portion. The apparatus comprises a pair of sub side frames, wherein one sub side frame is located under each side frame, and wherein each sub side frame has a front end portion, a rear end portion and a curved portion and wherein each curved portion is located between the front end portion and the rear end portion of its associated sub side frame, and wherein each curved portion extends downward and away from the associated side frame, and wherein said front end portion of each sub side frame is connected to the front end portion of the associated side frame, and wherein the rear end portion of each sub side frame is connected to the rear end portion of the associated side frame. The apparatus comprises a pair of side mounts for supporting the power train, wherein one of the side mounts is attached to each curved portion.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments taken in conjunction with the accompanying drawings in which:

DESCRIPTION OF THE PREFERRED EMBODIMENTS

Figure 1:
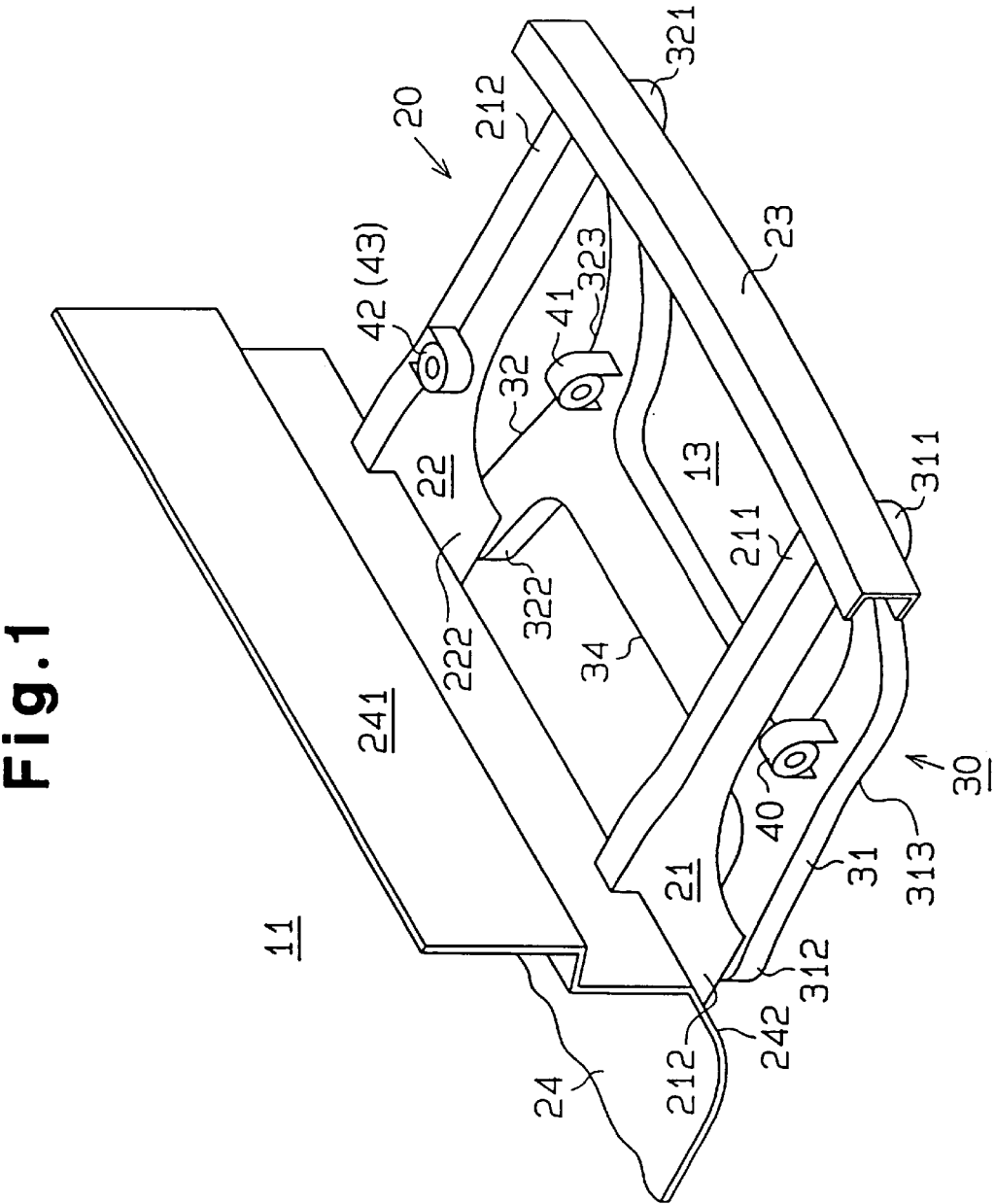
FIG. 1 is a perspective view of a power train supporting apparatus according to a first embodiment of the present invention, which is to be located at the front of a vehicle.

A power train supporting apparatus according to a first embodiment of the present invention will now be described referring to the attached drawings.

FIGS. 1 to 5 show a supporting apparatus 20 for a power train according to the first embodiment of a vehicle 10 having such supporting apparatus 20. The vehicle 10 has a monocoque frame structure, and the frames depicted here should have body panels integrated therewith. In FIGS. 1 to 5, for avoiding complication of the drawings and for easier description, the frames are schematically shown. In this embodiment, the term "front" or "forward" is the direction in which the vehicle 10 advances, unless otherwise specified.

A pair of floor side members 12 are located under the floor and on each side of a passenger compartment 11 on each side. A right side member 21 and a left side member 22 are connected to the front ends of the respective floor side members 12. A sub-frame 30 is located under these two front side members 21, 22. The sub-frame 30 has a ladder-like plan view. A bumper reinforcement 23 is connected to free ends (front ends) of the side members 21, 22.

Figure 3:
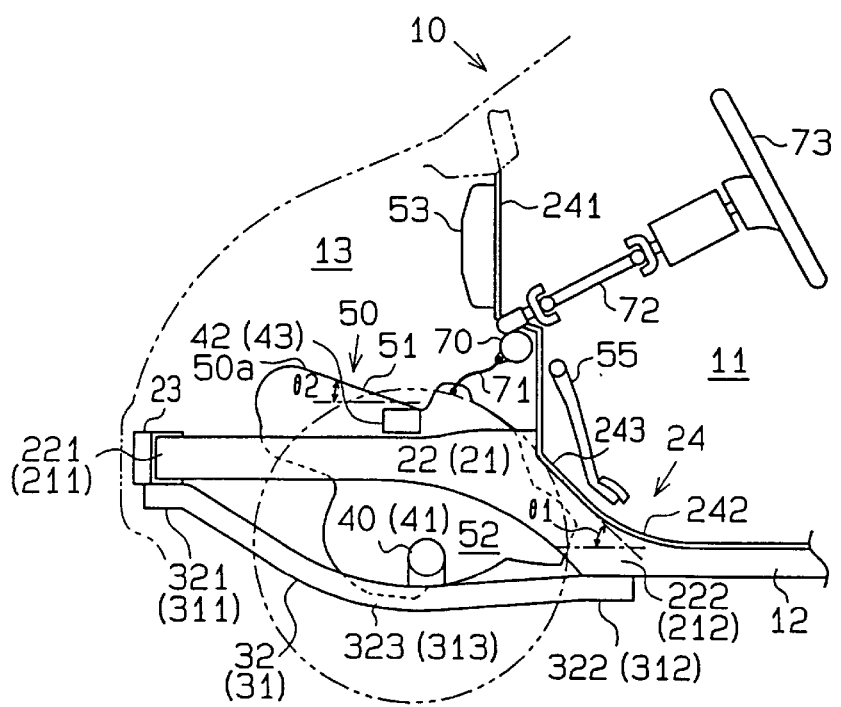
FIG. 3 is a side view of the supporting apparatus shown in FIG. 1.

As shown in FIG. 3, a toe board 24 is connected to portions around the joints between the side members 21, 22 and the floor side members 12. The toe board 24 defines an engine compartment 13 and the passenger compartment 11. A power train 50 accommodated in the engine compartment 13 includes an engine 51 and a transmission 52.

Figure 2:
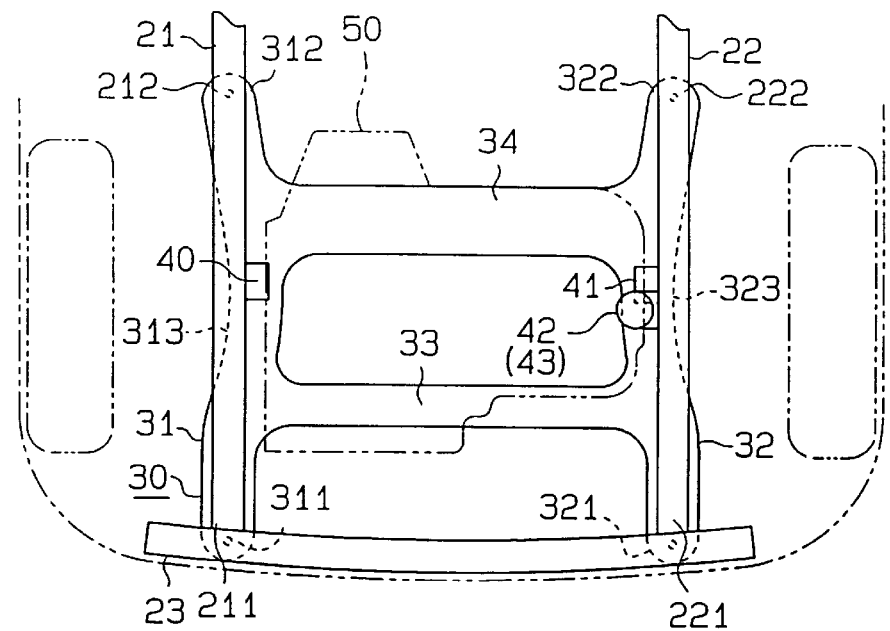
FIG. 2 is a plan view of the supporting apparatus shown in FIG. 1.

As shown in FIG. 2, the sub-frame 30 has a right sub-side member 31, a left sub-side member 32, a sub-front member 33 and a sub-rear member 34. The right sub-side member 31 is arranged substantially parallel to the right side member 21. The left sub-side member 32 is arranged substantially parallel to the left side member 22. The sub-front member 33 connects these two sub-side members 31, 32 below the front face of the power train 50. The sub-rear member 34 connects these two sub-side members 31, 32 below the rear face of the power train 50.

The right sub-side member 31 has a front connecting end 311 connected to the distal end 211 of the right side member 21 and a rear connecting end 312 connected to the proximal end 212 of the right side member 21. The left sub-side member 32 has a front connecting end 321 connected to the distal end 221 of the left side member 22 and a rear connecting end 322 connected to the proximal end 222 of the left side member 22.

As shown in FIG. 3, the sub-side members 31, 32 have curved portions 313, 323. When the sub-side members 31, 32 (sub-frame 30) are attached to the side members 21, 22, respectively, the portions of the sub-side members 31, 32 located below the power train 50 are parallel to the road surface. The portions of the sub-side members 31, 32 extending forward from the front face of the power train 50 are inclined diagonally upward toward the front face of the vehicle 10.

A first engine mount 40 is attached to the curved portion 313 of the right sub-side member 31. A second engine mount 41 is attached to the curved portion 323 of the left sub-side member 32. The first and second engine mounts 40, 41 are of an ordinary construction. Engine mounts 40, 41, simply made of an elastomeric body such as a rubber, a synthetic resin, or liquid-sealed engine mounts are preferable.

The toe board 24 contains a vertical face 241, a curved face 242 and a inclined surface 243 located between the faces 241 and 242. The inclined surface 243 is inclined with respect to the horizontal direction by a given angle θ1. An instrument panel (not shown) is applied to the vertical face 241 on the passenger compartment 11 side. The curved face 242 is formed to bulge toward the engine compartment 13 so that the feet of seated passengers may be rested comfortably thereon. A brake pedal 55 is located in accordance with the inclined surface 243. A brake booster 53 and a steering rack gear housing 70 are located in front of the toe board 24.

The gear housing 70 is connected to the top of the power train 50 by a wire 71. A steering wheel 73 is connected to an intermediate shaft 72 connected to the gear housing 70.

The power train 50 is supported at the bottom by the sub-frame 30 via the engine mounts 40, 41. The power train 50 is supported at the top by the left front side member 22 via a third engine mount 42. The top surface 50a of the power train 50 is inclined with respect to the horizontal direction by a given angle θ2. The angle θ2 of the top surface is substantially the same as the angle θ1 of the inclined surface 243. The first and second engine mounts 40, 41 mainly bear the weight of the power train 50. The third engine mount 42 restricts side to side and forward to backward oscillation of the power train 50.

Figure 4:
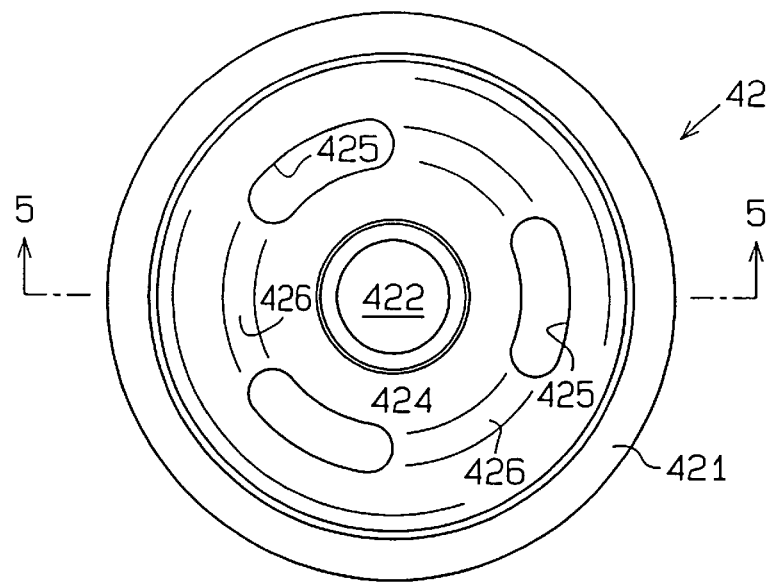
FIG. 4 is a plan view showing a third engine mount to be included in the supporting apparatus.
Figure 5:
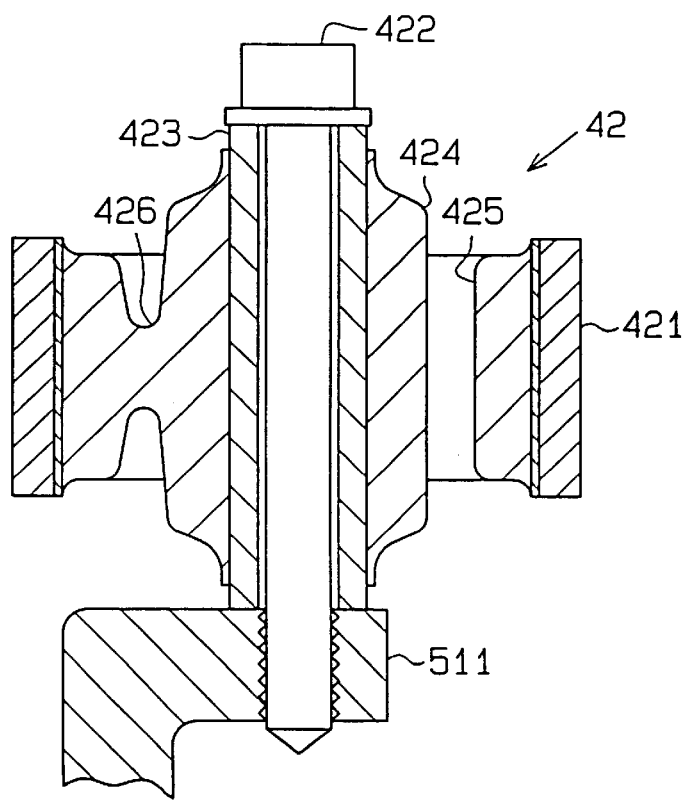
FIG. 5 is a cross-sectional view taken along the line 5—5 in FIG. 4.

As shown in FIGS. 4 and 5, the third engine mount 42 has a large cylinder 421, a fastening bolt 422, a small cylinder 423 and an insulator 424. The small cylinder 423 is located concentrically in the large cylinder 421, and these cylinders 421, 423 are connected to each other with the insulator 424. The large cylinder 421 is connected to the left front side member 22. The small cylinder 423 is attached to a bracket 511 formed on the engine 51 (power train 50) with the fastening bolt 422. Transmission of vibration between these two cylinders 421, 423 is moderated by the insulator 424.

As shown in FIG. 4, the insulator 424 has a plurality of (three in this embodiment) arcuate through holes 425. As shown in FIG. 5, the insulator 424 has thin breakable portions 426. That is, the cylinders 421, 423 are connected to each other only at these thin breakable portions 426. The breakable portions 426 are broken when a load exceeding a predetermined value is applied to them. The breakage of these portions 426 separates the large cylinder 421 and the small cylinder 423 from each other. The thickness of the breakable portions 426 in the axial direction is chosen depending on the load to be required for breakage thereof.

Figure 8:
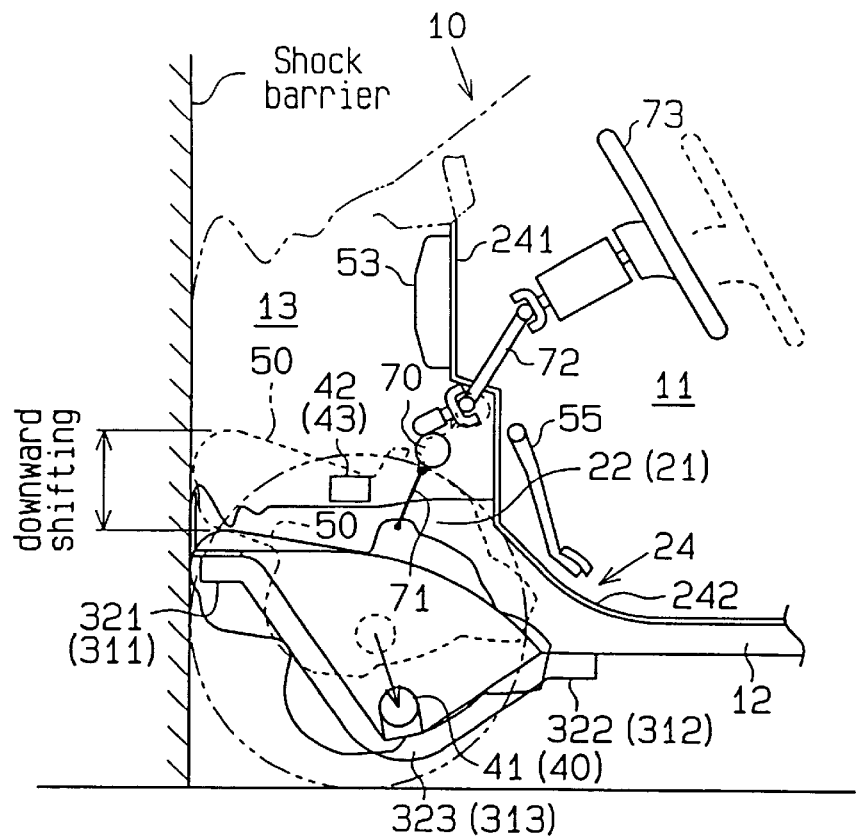
FIG. 8 is an explanatory drawing showing actions of the supporting apparatus when a vehicle bumps against an obstacle.
Figure 9:
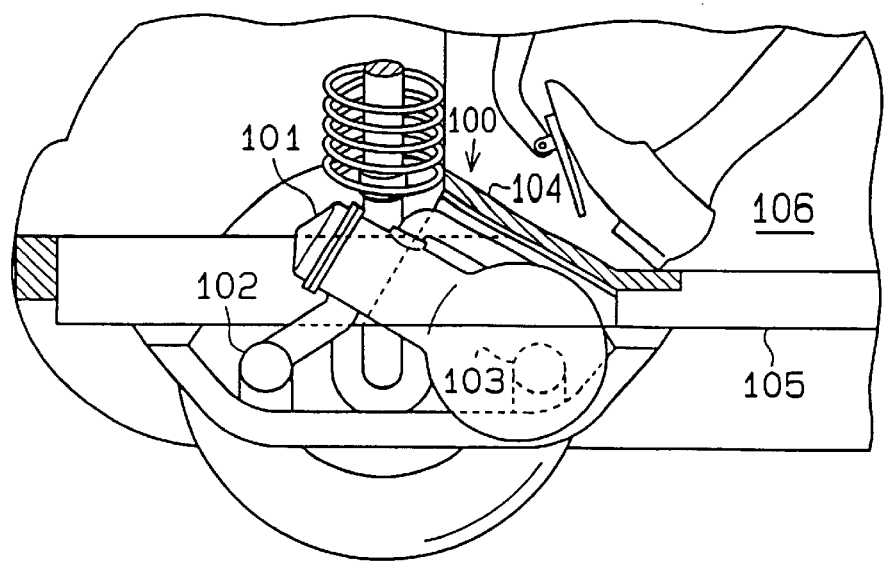
FIG. 9 is a side view showing a prior art arrangement structure of an automotive power train.
Figure 10:
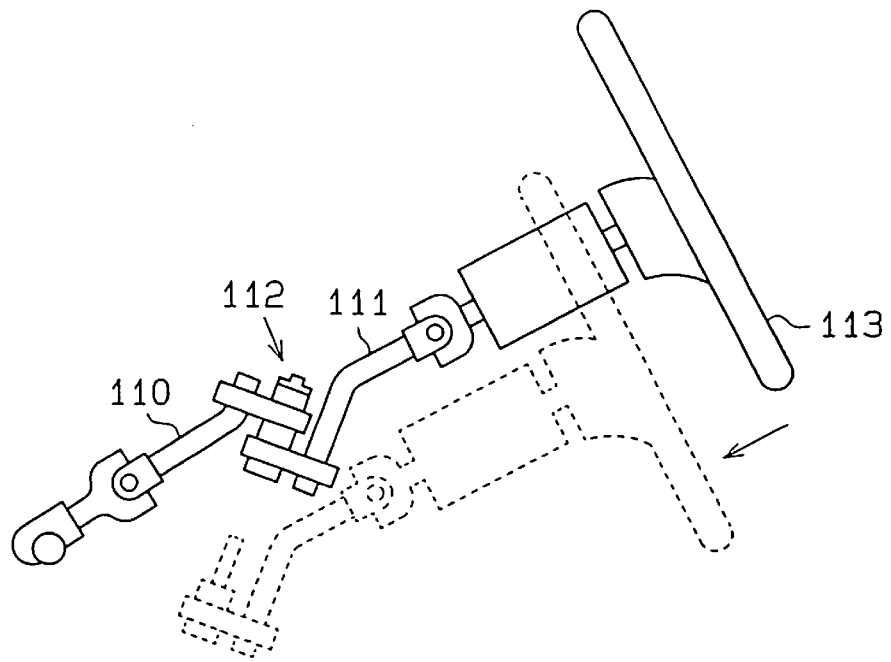
FIG. 10 is an explanatory drawing showing a prior art structure for moderating collision impact applied to the steering wheel.
Figure 11:
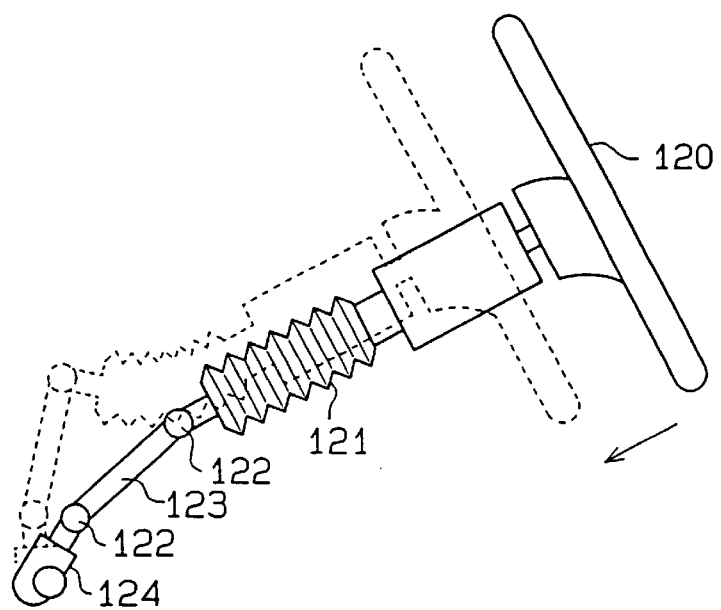
FIG. 11 is an explanatory drawing showing another prior art structure for moderating collision impact acting upon the steering wheel.

FIG. 8 shows the action of the supporting apparatus 20 when the vehicle bumps head on against an obstacle such as a wall (a shock barrier in FIG. 8). The bumper reinforcement 23, which is first brought into contact with the obstacle when the front of the vehicle 10 bumps against it, is subjected to a horizontal load. This horizontal load is divided into an axial load (horizontal) to be applied to the front side members 22, 21 and to an axial load (diagonally downward toward the rear of the vehicle 10) to be applied to the sub-side members 31, 32.

The side members 21, 22 subjected to the axial load are compressed in the axial direction. With this compression, a horizontal load toward the passenger compartment 11 is applied to the front connecting end 311 of the right sub-side member 31 and the front connecting end 321 of the left sub-side member 32. Accordingly, the sub-side members 31, 32 are subjected to stress in the axial direction thereof (diagonally downward stress toward the rear of the vehicle 10) and a rotational stress caused by the horizontal load toward the rear of the vehicle 10.

Generally speaking, long members are resistant to axial loads but yield to laterally applied loads. The sub-side members 31, 32 according to this embodiment have the curved portions 313, 323, which can bend. Accordingly, the rotational stress concentrates at the curved portions 313, 323 of the sub-side members 31, 32, so that the sub-side members 31, 32 are readily bent about the curved portions 313, 323. Thus, the sub-side members 31, 32 can be bent relatively smoothly by application of such a load.

In this instance, the positions of the connecting ends 313, 312 of the right sub-side member 31 and the connecting ends 321, 322 of the left sub-side member 32 do not change in the vertical direction. Meanwhile, the axial stress acts upon the sub-side members 31, 32, so that the curved portions 313, 323 are shifted downward with the bending of the sub-side members 31, 32.

The first and second engine mounts 40, 41 are attached to the subside members 31, 32 adjacent to the curved portions 313, 323 thereof, respectively. These engine mounts 40, 41 support the power train 50 at the bottom to receive its weight. Accordingly, when the curved portions 313, 323 are shifted downward with the bending of the sub-side members 31, 32, the engine mounts 40, 41 are shifted downward to allow the power train 50 to shift downward smoothly and speedily. With the downward shifting of the power train 50, tension is applied to the wire 71 to apply a downward force to the gear box 70.

With the progress of horizontal contraction of the front side members 21, 22 after the collision, the sub-side members 31, 32 are bent further, and the power train 50 is carried downward with the shifting of the curved portions 313, 323.

The power train 50 is supported at the top on the front side member 22 via the third engine mount 42. Accordingly, when the power train 50 is carried downward, the small cylinder 423 of the engine mount 42 is pulled downward to apply a vertical load to the breakable portions 426. The breakable portions 426 are broken when a load exceeding a predetermined value is applied thereto. Then, the small cylinder 423 connected to the power train 50 is separated from the large cylinder 421 connected to the front side member 22. This permits shifting of the power train 50, and thus the power train 50 is shifted smoothly downward together with the sub-side members 31, 32. In other words, resistance on the vertical shifting of the power train 50 is released when a load exceeding the predetermined level is applied to the engine mount 42.

As described above, after the power train 50 has shifted downward, there is nothing left in the engine compartment 13 to interfere with axial contraction of the side members 21, 22. Therefore, the energy of the collision is absorbed by the axial contraction of the side members 21, 22. In this context, the impact load upon the passenger compartment 11 at collision is moderated.

The third engine mount 42 permits the cylinders 421, 423 to separate from each other when a load exceeding a predetermined level is applied thereto. Accordingly, if the predetermined value is set at an appropriate level, inadvertent shifting of the power train 50 is not permitted at occasions other than collision of the vehicle 10.

The toe board 24 is adapted to avoid contact with the power train 50 shifting downward. Further, if the vehicle 10 has a residual inertia force when shifting of the power train 50 is completed, the toe board 24 slips over the power train 50. Accordingly, damage to the toe board 24 by the power train 50 is prevented. In this regard, the impact load on the passenger compartment 11 at collision is moderated.

Meanwhile, when the power train 50 has shifted to some extent, the gear box 70 is pulled downward. When the gear box 70 is pulled downward, the intermediate shaft 72 connected to the gear box 70 is pivoted upward. Thus, the steering wheel 73 attached to the distal end of the intermediate shaft 72 is pulled toward the engine compartment 13. In other words, the downward shifting of the gear box 70 is converted by the motion of the intermediate shaft 72 to shifting of the steering wheel 73 toward the front of the vehicle 10. Consequently, the impact load applied to the steering wheel 73 is moderated.

According to this embodiment, the intermediate shaft 72 is not pivoted when the vehicle 10 bumps lightly against an obstacle. Thus, malfunctions associated with the structure of the intermediate shaft 72 for moderating the impact load applied to the steering wheel 73 are prevented. In the case of a heavy collision such that the power train 50 shifts downward, the impact load upon the wheel 73 is moderated. The wire 71 transmits only through tension to the gear housing 70. Therefore, the wheel 73 is not pushed toward the passenger compartment 11.

The sub-frame 30 has the pair of sub-side members 31, 32 to be located on each side of the power train 50. Accordingly, even when a so-called offset collision, where the front of the vehicle 10 bumps only at one side against an obstacle, occurs, the corresponding side of the power train 50 positively shifts downward.

In the sub-frame 30, the sub-side members 31, 32 are combined by the sub-front member 33 and the sub-rear member 34 into a ladder-like form. Accordingly, if the vehicle 10 undergoes an offset collision, compression of one sub-side member 31 or 32 in the axial direction is transmitted by the sub-front member 33 to the other sub-side member 32 or 31. Thus, the other sub-side member 32 or 31 is also deformed in the axial direction.

The connecting ends 311, 321 of the sub-side members 31, 32 are connected to the distal ends 211, 221 of the front side members 21, 22, respectively. Accordingly, the sub-side members 31, 32 are bent at the beginning of the collision of the vehicle 10 with the obstacle.

In this embodiment, the power train 50 never shifts in the horizontal direction during a collision. Accordingly, the brake booster 53 and the gear housing 70 are not pushed backward by the power train 50. In this context, the impact load upon the brake pedal 55 or the steering wheel 73 is moderated.

Figure 6:
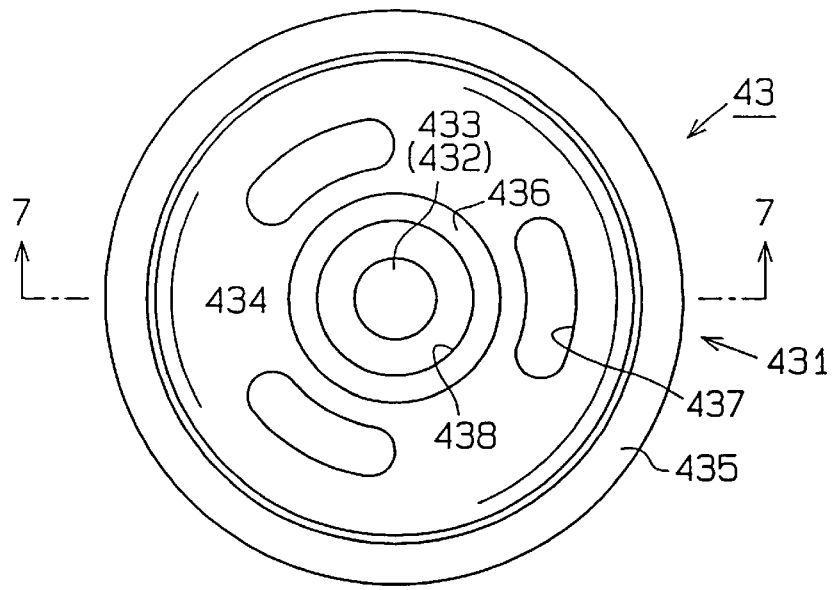
FIG. 6 is a plan view according to a second embodiment of the present invention showing a fourth engine mount to be included in the supporting apparatus.
Figure 7:
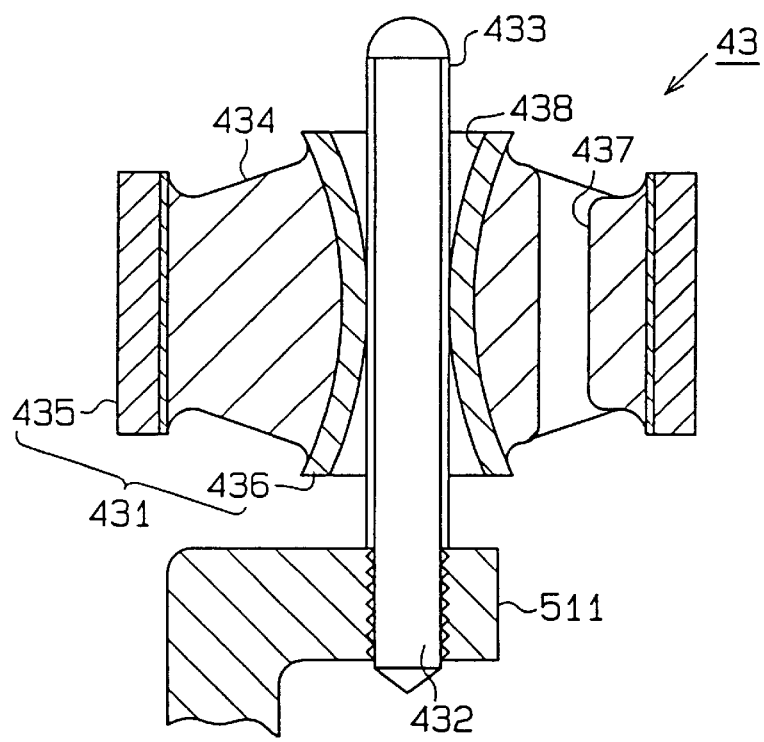
FIG. 7 is a cross-sectional view taken along the line 7—7 in FIG. 6.

Next, the supporting apparatus according to a second embodiment of the present invention will be described referring to FIGS. 6 and 7. A supporting apparatus 60 according to the second embodiment is characterized in that it has a third engine mount 43 in place of the third engine mount 42. The third engine mount 43 has a different structure. In this embodiment, the construction of the parts other than the third engine mount 43 is the same as in the first embodiment. Therefore, parts similar to those in the first embodiment are affixed with the same reference numbers, and a description of them will be omitted.

The third engine mount 43 has a double-wall cylinder 431 and a rod 433. The double-wall cylinder 431 is connected to the left front side member 22. The rod 433 is attached to the bracket 511 formed on an engine 51 with a fastening bolt 432.

The double-wall cylinder 431 contains an outer large cylinder 435, a small cylinder 436 located in the large cylinder 435 and an insulator 434 for connecting these cylinders 435, 436 to each other. The small cylinder 436 has an insertion hole 438 for inserting the rod 433 therein. The hole 438 is curved with respect to the circumference of the rod 433. As shown in FIG. 6, the insulator 434 contains a plurality of (three in this embodiment) through holes 437 each having an arcuate cross section.

The third engine mount 43 is assembled by inserting the rod 433 into the insertion hole 438 of the small cylinder 436. Accordingly, the rod 433 is prevented from oscillating right and left, as well as, forward and backward by the double-wall cylinder 431, but shifting of the rod 433 in the vertical direction is permitted within a predetermined range. This construction permits downward shifting of the power train 50.

Movement of the power train 50 supported by the supporting apparatus 60 according to the second embodiment, during a front-end collision of the vehicle 10, will now be described. The manner of the power train 50 shift in the second embodiment is basically the same as that of the first embodiment illustrated in FIG. 8. Therefore, points where the embodiments will be mainly described below.

The power train 50 is supported at the top on the front side member 22 with the engine mount 43. Accordingly, when the power train 50 shifts downward, a vertical load is applied to the engine mount 43. In this instance, the rod 433 in the engine mount 43 slides vertically within a predetermined range with respect to the small cylinder 438. This permits downward shifting of the power train 50, and thus the power train 50 can be shifted smoothly downward together with the sub-side members 31, 32.

As described above, after the power train 50 shifts downward during the collision of the vehicle 10, there is nothing left in the engine compartment 13 that interferes with the axial contraction of the front side members 21, 22. This permits deformation of the front side members 21, 22, and this deformation absorbs the energy of the collision. Consequently, the toe board 24 is not damaged by the shift of the power train 50. That is, the impact load upon the passenger compartment 11 at collision is moderated.

The third engine mount 43 permits shifting of the power train 50 only when the sub-side members 31, 32 are bent, that is, at collision of the vehicle 10. Accordingly, inadvertent shifting of the power train 50 is not allowed in the cases other than collision of the vehicle 10.

Other actions and effects of the second embodiments are basically the same as those in the first embodiment.

Although only two embodiments of the present invention have been described herein, it should be apparent to those skilled in the art that the present invention may be embodied in many other specific forms without departing from the spirit or scope of the invention. Particularly, it should be understood that the present invention may be embodied in the following manner.

In the foregoing embodiments, the sub-side members 31, 32 are combined with each other by the sub-front member 33 and sub-rear member 34 to form the ladder-like sub-frame 30. However, the sub-frame may be formed by merely locating the sub-side members 31, 32 on each lower side of the power train 50. In this case, during an offset collision of the vehicle 10, shifting of the power train 50 at the corresponding side is permitted.

In the foregoing embodiments, the sub-front member 33 and the sub-rear member 34 are connected to the sub-side members 31, 32 at positions adjacent to the distal ends 311, 321 and proximal ends 312, 322 of the members 31, 32, respectively. However, the connecting positions of the sub-front member 33 and of the sub-rear member 34 may not be adjacent to the distal ends and the proximal ends but may be exactly at the distal ends 311, 321 and the proximal ends 312, 322 of the sub-side members 31, 32. That is, so long as the sub-side members 31, 32 to be connected to each other are located on each side of the vehicle 10, axial contraction of one sub-side member 31 or 32 can be transmitted to the other sub-side member 32 or 31.

In the foregoing embodiments, only the sub-side members 31, 32 form as the sub-frame 30 in the longitudinal direction of the vehicle 10. However, a sub-center member extended in the longitudinal direction of the vehicle 10 may be located below the power train 50.

In the foregoing embodiments, mounts other than the third engine mount 42, 43 can be also employed so long as they can restrict oscillation of the power train 50 right and left, as well as, forward and backward and permit vertical shifting of the power train 50.

Therefore, the present examples and embodiments are to be considered as illustrative and not restrictive, and the invention is not to be limited to the details given herein, but may be modified within the scope of the appended claims.

What is claimed is:

1. A power train supporting apparatus in an engine compartment of a vehicle, said apparatus comprising:

a pair of side frames, wherein one side frame is located on each side of the vehicle, and wherein each side frame extends along a direction in which the vehicle advances and has a front end portion and a rear end portion;

a pair of sub side frames, wherein each sub side frame is located under an associated side frame of the pair of side frames, and wherein each sub side frame has:
a front end portion,
a rear end portion, and
a curved portion located between the front end portion and the rear end portion,
and wherein each curved portion extends downward and away from its associated side frame, and wherein said front end portion of each sub side frame is connected to the front end portion of its associated side frame, and wherein the rear end portion of each sub side frame is connected to the rear end portion of its associated side frame; and
wherein the sub side frame is adapted to deform without losing load transmission in the sub side frame when an impact load is applied to the front end portion of at least one side frame through the side frame to its associated sub side frame; and
a pair of side mounts for supporting the power train, wherein one of the side mounts is attached to each curved portion.

2. The apparatus according to claim 1, wherein each curved portion is formed such that it is bent downward when a load exceeding a predetermined value is applied thereto.

3. The apparatus according to claim 2 further comprising:
a first connecting member for connecting the sub side frames together at portions near the front end portions thereof; and
a second connecting member for connecting the sub side frames together at portions near the rear end portions thereof.

4. The apparatus according to claim 3, wherein said vehicle further comprises:
a passenger compartment adjacent to the engine compartment, wherein said compartments are separated by a partition;
a steering gear box;
an intermediate shaft; and
a steering wheel, wherein the steering wheel is attached to the intermediate shaft and is located in the passenger compartment, and wherein the intermediate shaft is connected to the steering gear box; and
a connecting member to connect the power train with the steering gear box.

5. The apparatus according to claim 1 further comprising:
a first connecting member for connecting the sub side frames together at portions near the front end portions thereof; and
a second connecting member for connecting the sub side frames together at portions near the rear end portions thereof.

6. The apparatus according to claim 1 further comprising at least one upper mount for supporting the power train, wherein said upper mount is attached to at least one of the side frames, and wherein said upper mount restricts horizontal motion of the power train and allows downward motion of the power train.

7. The apparatus according to claim 6, wherein each curved portion is formed such that it is bent downward when a load exceeding a predetermined value is applied thereto.

8. The apparatus according to claim 7, wherein said upper mount has a first member and a second member, wherein said first member is elastomeric and has a cylindrical shape and is connected to either the power train or one of the side frames, wherein said second member has a rod shape and is inserted into the first member and is connected to the other of the power train or one of the side frames and wherein the second member is movable in a vertical direction with respect to the first member.

9. The apparatus according to claim 7 further comprising:
a first connecting member for connecting the sub side frames together at portions near the front end portions thereof; and
a second connecting member for connecting the sub side frames together at portions near the rear end portions thereof.

10. The apparatus according to claim 9, wherein said upper mount has a first member and a second member, wherein said first member is elastomeric and has a cylindrical shape and is connected to either the power train or one of the side frames, wherein said second member has a rod shape and is inserted into the first member and is connected to the other of the power train or one of the side frames and wherein the second member is movable in a vertical direction with respect to the first member.

11. The apparatus according to claim 9, wherein said vehicle further comprises:
a passenger compartment adjacent to the engine compartment, wherein said compartments are separated by a partition;

a steering gear box;

an intermediate shaft; and a steering wheel, wherein the steering wheel is attached to the intermediate shaft and is located in the passenger compartment, and wherein the intermediate shaft is connected to the steering gear box; and a connecting member to connect the power train with the steering gear box.

12. The apparatus according to claim 6 further comprising:

a first connecting member for connecting the sub side frames together at portions near the front end portions thereof; and a second connecting member for connecting the sub side frames together at portions near the rear end portions thereof.

13. The apparatus according to claim 12, wherein said upper mount has a first member and a second member, wherein said first member is elastomeric and has a cylindrical shape and is connected to either the power train or one of the side frames, wherein said second member has a rod shape and is inserted into the first member and is connected to the other of the power train or one of the side frames and wherein the second member is movable in a vertical direction with respect to the first member.

14. The apparatus according to claim 6, wherein said upper mount has a first member and a second member, wherein said first member is elastomeric and has a cylindrical shape and is connected to either the power train or one of the side frames, wherein said second member has a rod shape and is inserted into the first member and is connected to the other of the power train or one of the side frames and wherein the second member is movable in a vertical direction with respect to the first member.

15. The apparatus according to claim 6, wherein said vehicle further comprises:

a steering gear box;

an intermediate shaft;

a steering wheel, wherein the steering wheel is attached to the intermediate shaft and wherein the intermediate shaft is connected to the steering gear box; and a connecting member to connect the power train with the steering gear box.

16. The apparatus according to claim 15, wherein said power train is located such that a upper surface thereof is inclined with respect to the horizontal direction by a given angle.

17. A power train supporting apparatus in an engine compartment of a vehicle, said apparatus comprising:

a pair of side frames, wherein one side frame is located on each side of the vehicle, and wherein each side frame extends along a direction in which the vehicle advances and has a front end portion and a rear end portion;

a pair of sub side frames, wherein each sub side frame is located under an associated side frame of the pair of side frames, and wherein each sub side frame has:

a front end portion, a rear end portion, and a curved portion located between the front end portion and the rear end portion, and wherein each curved portion extends downward and away from its associated side frame, and wherein said front end portion of each sub side frame is connected to the front end portion of its associated side frame, and wherein the rear end portion of each sub side frame is connected to the rear end portion of its associated side frame; and wherein the sub side frame is adapted to deform without losing load transmission in the sub side frame when an impact load is applied to the front end portion of at least one side frame through the side frame to its associated sub side frame;

a pair of side mounts for supporting the power train, wherein one of the side mounts is attached to each curved portion; and wherein said vehicle further comprises a steering gear box;

an intermediate shaft;

a steering wheel, wherein the steering wheel is attached to the intermediate shaft and wherein the intermediate shaft is connected to the steering gear box; and a connecting member to connect the power train with the steering gear box.

18. The apparatus according to claim 17, wherein said power train is located such that a upper surface thereof is inclined with respect to the horizontal direction by a given angle.

19. A power train supporting apparatus in an engine compartment of a vehicle, said apparatus comprising:

a pair of side frames, wherein one side frame is located on each side of the vehicle, and wherein each side frame extends along a direction in which the vehicle advances and has a front end portion and a rear end portion;

a pair of sub side frames, wherein each sub side frame is located under an associated side frame of the pair of side frames, and wherein each sub side frame has:

a front end portion, a rear end portion, and a curved portion located between the front end portion and the rear end portion, and wherein each curved portion extends downward and away from its associated side frame, and wherein said front end portion of each sub side frame is connected to the front end portion of its associated side frame, and wherein the rear end portion of each sub side frame is connected to the rear end portion of its associated side frame;

a pair of side mounts for supporting the power train, wherein one of the side mounts is attached to each curved portion; and wherein said vehicle further comprises a steering gear box;

an intermediate shaft;

a steering wheel, wherein the steering wheel is attached to the intermediate shaft and wherein the intermediate shaft is connected to the steering gear box; ad nd a connecting member to connect the power train with the steering gear box;

wherein said connecting member includes a wire.

20. A power train supporting apparatus in an engine compartment of a vehicle, said apparatus comprising:

a pair of side frames, wherein one side frame is located on each side of the vehicle, and wherein each side frame extends along a direction in which the vehicle advances and has a front end portion and a rear end portion;

a pair of sub side frames, wherein each sub side frame is located under an associated side frame of the pair of side frames, and where in each sub side frame has:

a front end portion, a rear end portion, and a curved portion located between the front end portion and the rear end portion, and wherein each curved portion extends downward and away from its associated side frame, and wherein said front end portion of each sub side frame is connected to the front end portion of its associated side frame, and wherein the rear end portion of each sub side frame is connected to the rear end portion of its associated side frame;
- a pair of side mounts for supporting the power train, wherein one of the side mounts is attached to each curved portion;
- at least one upper mount for supporting the power train, wherein said upper mount is attached to at least one of the side frames, and wherein said upper mount restricts horizontal motion of the power train and allows downward motion of the power train;
- wherein said vehicle further comprises:
  - a steering gear box;
  - an intermediate shaft;
  - a steering wheel, wherein the steering wheel is attached to the intermediate shaft and wherein the intermediate shaft is connected to the steering gear box; and
  - a connecting member to connect the power train with the steering gear box; and
- wherein said connecting member includes a wire.

21. A power train supporting apparatus in an engine compartment of a vehicle, said apparatus comprising:
- a pair of side frames, wherein one side frame is located on each side of the vehicle, and wherein each side frame extends along a direction in which the vehicle advances and has a front end portion and a rear end portion;
- a pair of sub side frames, wherein each sub side frame is located under an associated side frame of the pair of side frames, and wherein each sub side frame has:
  - a front end to portion,
  - a rear end portion, and
  - a curved portion located between the front end portion and the rear end portion, and wherein each curved portion extends downward and away from its associated side frame, and wherein said front end portion of each sub side frame is connected to the front end portion of its associated side frame, and wherein the rear end portion of each sub side frame is connected to the rear end portion of its associated side frame;
- a pair of side mounts for supporting the power train, wherein one of the side mounts is attached to each curved portion;
- at least one upper mount for supporting the power train, wherein said upper mount is attached to at least one of the side frames, and wherein said upper mount restricts horizontal motion of the power train and allows downward motion of the power train; and
- wherein said upper mount has a first member, a second member and an elastic member, wherein said first member is connected to one of the side frames, wherein said second member is connected to the power train, and wherein said elastic member connects the first member with the second member, and wherein said elastic member has at least one breakable portion that is broken to separate the first member from the second member when a load exceeding a predetermined value is applied thereto in a vertical direction.

22. A power train supporting apparatus in an engine compartment of a vehicle, said apparatus comprising:
- a pair of side frames, wherein one side frame is located on each side of the vehicle, and wherein each side frame extends along a direction in which the vehicle advances and has a front end portion and a rear end portion;
- a pair of sub side frames, wherein each sub side frame is located under an associated side frame of the pair of side frames, and wherein each sub side frame has:
  - a front end portion,
  - a rear end portion, and
  - a curved portion located between the front end portion and the rear end portion, and wherein each curved portion extends downward and away from its associated side frame, and wherein said front end portion of each sub side frame is connected to the front end portion of its associated side frame, and wherein the rear end portion of each sub side frame is connected to the rear end portion of its associated side frame;
- a pair of side mounts for supporting the power train, wherein one of the side mounts is attached to each curved portion;
- at least one upper mount for supporting the power train, wherein said upper mount is attached to at least one of the side frames, and wherein said upper mount restricts horizontal motion of the power train and allows downward motion of the power train;
- wherein each curved portion is formed such that it is bent downward when a load exceeding a predetermined value is applied thereto; and
- wherein said upper mount has a first member, a second member and an elastic member, wherein said first member is connected to one of the side frames, wherein said second member is connected to the power train, and wherein said elastic member connects the first member with the second member, and wherein said elastic member has at least one breakable portion that is broken to separate the first member from the second member when a load exceeding a predetermined value is applied thereto in a vertical direction.

23. A power train supporting apparatus in an engine compartment of a vehicle, said apparatus comprising:
- a pair of side frames, wherein one side frame is located on each side of the vehicle, and wherein each side frame extends along a direction in which the vehicle advances and has a front end portion and a rear end portion;
- a pair of sub side frames, wherein each sub side frame is located under an associated side frame of the pair of side frames, and wherein each sub side frame has:
  - a front end portion,
  - a rear end portion, and
  - a curved portion located between the front end portion and the rear end portion, and wherein each curved portion extends downward and away from its associated side frame, and wherein said front end portion of each sub side frame is connected to the front end portion of its associated side frame, and wherein the rear end portion of each sub side frame is connected to the rear end portion of its associated side frame; and
- wherein the sub side frame is adapted to deform without losing load transmission in the sub side frame when an impact load is applied to the front end portion of at least one side frame through the side frame to its associated sub side frame;
- a pair of side mounts for supporting the power train, wherein one of the side mounts is attached to each curved portion;
- at least one upper mount for supporting the power train, wherein said upper mount is attached to at least one of the side frames, and wherein said upper mount restricts horizontal motion of the power train and allows downward motion of the power train;
- a first connecting member for connecting the sub side frames together at portions near the front end portions thereof;

a second connecting member for connecting the sub side frames together at portions near the rear end portions thereof; and wherein said upper mount has a first member, a second member and an elastic member, wherein said first member is connected to one of the side frames, wherein said second member is connected to the power train, and wherein said elastic member connects the first member with the second member, and wherein said elastic member has at least one breakable portion that is broken to separate the first member from the second member when a load exceeding a predetermined value is applied thereto in a vertical direction.

24. A power train supporting apparatus in an engine compartment of a vehicle, said apparatus comprising:

a pair of side frames, wherein one side frame is located on each side of the vehicle, and wherein each side frame extends along a direction in which the vehicle advances and has a front end portion and a rear end portion;

a pair of sub side frames, wherein each sub side frame is located under an associated side frame of the pair of side frames, and wherein each sub side frame has:
a front end portion,
a rear end portion, and
a curved portion located between the front end portion and the rear end portion, and wherein each curved portion extends downward and away from its associated side frame, and wherein said front end portion of each sub side frame is connected to the front end portion of its associated side frame, and wherein the rear end portion of each sub side frame is connected to the rear end portion of its associated side frame; and wherein the sub side frame is adapted to deform without losing load transmission in the sub side frame when an impact load is applied to the front end portion of at least one side frame through the side frame to its associated sub side frame;

a pair of side mounts for supporting the power train, wherein one of the side mounts is attached to each curved portion;

at least one upper mount for supporting the power train, wherein said upper mount is attached to at least one of the side frames, and wherein said upper mount restricts horizontal motion of the power train and allows downward motion of the power train;

wherein each curved portion is formed such that it is bent downward when a load exceeding a predetermined value is applied thereto;

a first connecting member for connecting the sub side frames together at portions near the front end portions thereof;

a second connecting member for connecting the sub side frames together at portions near the rear end portions thereof; and wherein said upper mount has a first member, a second member and an elastic member, wherein said first member is connected to one of the side frames, wherein said second member is connected to the power train, and wherein said elastic member connects the first member with the second member, and wherein said elastic member has at least one breakable portion that is broken to separate the first member from the second member when a load exceeding a predetermined value is applied thereto in a vertical direction.

25. A power train supporting apparatus in an engine compartment of a vehicle, said apparatus comprising:

a pair of side frames, wherein one side frame is located on each side of the vehicle, and wherein each side frame extends along a direction in which the vehicle advances and has a front end portion and a rear end portion;

a pair of sub side frames, wherein each sub side frame is located under an associated side frame of the pair of side frames, and wherein each sub side frame has;
a front end portion,
a rear end portion, and
a curved portion located between the front end portion and the rear end portion, and wherein each curved portion extends downward and away from its associated side frame, and wherein said front end portion of each sub side frame is directly connected to the front end portion of its associated side frame, and wherein the rear end portion of each sub side frame is connected to the rear end portion of its associated side frame; and a pair of side mounts for supporting the power train, wherein one of the side mounts is attached to each curved portion, and wherein the pair of side mounts are symmetrically arranged with respect to the vehicle advancing direction, wherein the side frame and the curved portion of the sub side frame are deformed to allow the side mounts to shift downward while keeping the front connection of each side frame and its associated sub side frame, when an impact load applied to the front end portion of at least one side frame is transmitted through the side frame to its associated sub side frame.

26. The apparatus according to claim 25 further comprising at least one upper mount for supporting the power train, wherein said upper mount is attached to at least one of the side frames, and wherein said upper mount restricts horizontal motion of the power train and allows downward motion of the power train.

27. The apparatus according to claim 26, wherein each curved portion is formed such that it is bent downward when a load exceeding a predetermined value is applied thereto.

28. The apparatus according to claim 27, wherein said upper mount has a first member, a second member and an elastic member, wherein said first member is connected to one of the side frames, wherein said second member is connected to the power train, and wherein said elastic member connects the first member with the second member, and wherein said elastic member has at least one breakable portion that is broken to separate the first member from the second member when a load exceeding a predetermined value is applied thereto in a vertical direction.

* * * * *

UNITED STATES PATENT AND TRADEMARK OFFICE
CERTIFICATE OF CORRECTION

PATENT NO.   :   6,131,685

DATED   :   17 October 2000

INVENTOR(S)   :   Sunao SAKAMOTO et al.

It is certified that error appears in the above-identified patent and that said Letters Patent is hereby corrected as shown below:

| Column | Line | |
|---|---|---|
| 1 | 6 | After "vehicle" insert --.--. |
| 1 | 7 | Change "more" to --More--; change "invent ion" to --invention--. |

Signed and Sealed this

Fifteenth Day of May, 2001

Attest:

NICHOLAS P. GODICI

Attesting Officer   Acting Director of the United States Patent and Trademark Office